No. 660,762. Patented Oct. 30, 1900.
G. L. THOMPSON.
NUT CRACKER.
(Application filed Feb. 5, 1900.)
(No Model.)
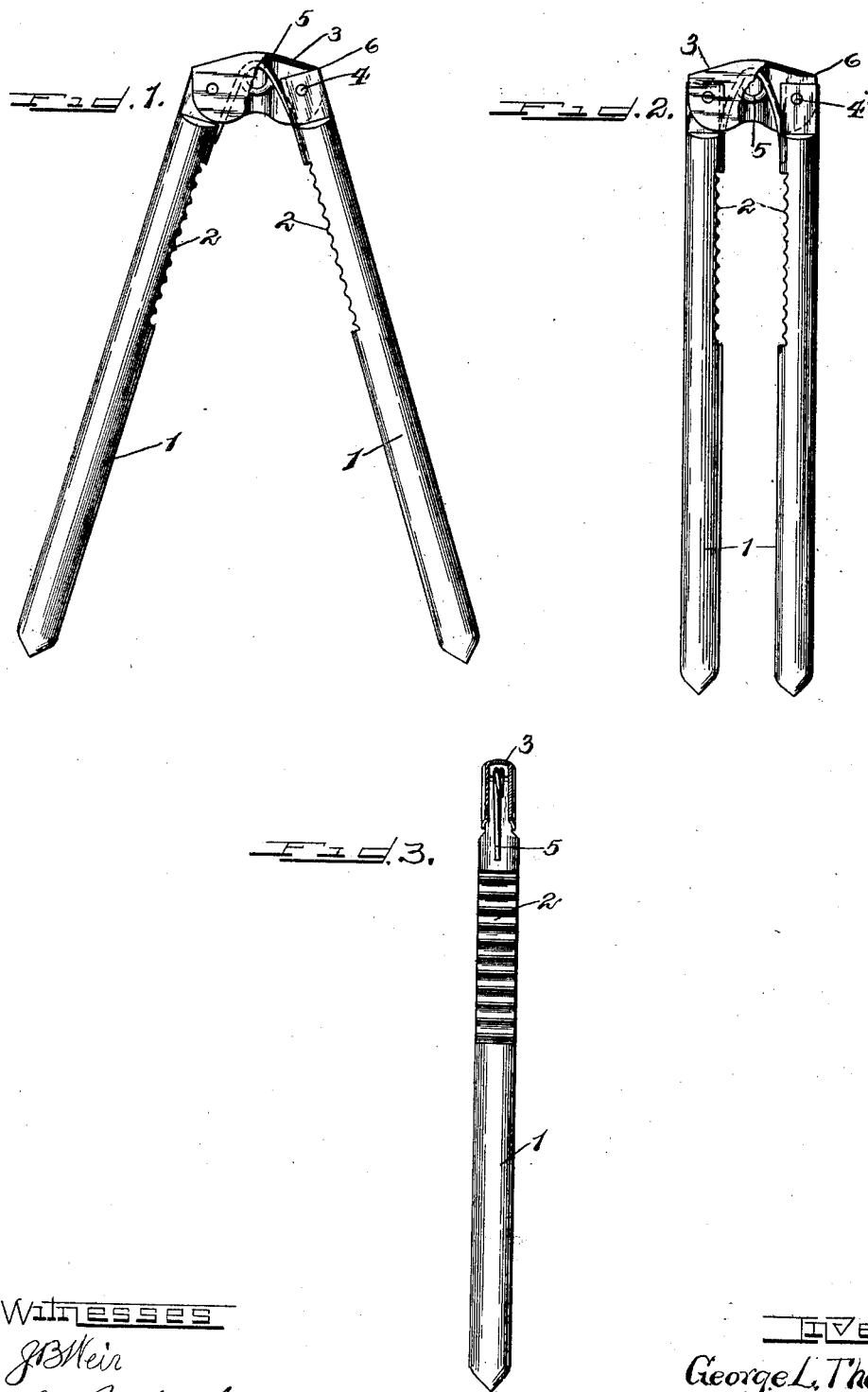

UNITED STATES PATENT OFFICE.

GEORGE L. THOMPSON, OF CHICAGO, ILLINOIS.

NUT-CRACKER.

SPECIFICATION forming part of Letters Patent No. 660,762, dated October 30, 1900.

Application filed February 5, 1900. Serial No. 3,930. (No model.)

*To all whom it may concern:*

Be it known that I, GEORGE L. THOMPSON, a citizen of the United States, residing at Chicago, in the county of Cook and State of Illinois, have invented Improvements in Nut-Crackers, of which the following is a specification.

This invention relates to improvements in nut-crackers, and has for its object to provide an improved construction in devices of this character.

The invention consists in the matters hereinafter set forth, and particularly pointed out in the appended claim, and will be fully understood from the following detailed description of the construction illustrated in the accompanying drawings, in which—

Figure 1 shows an open nut-cracker constructed in accordance with my invention. Fig. 2 shows the same with its jaws nearly closed together. Fig. 3 is a sectional view taken on line 3 3 of Fig. 1.

In said drawings, 1 designates the handles, which are provided, as usual, with jaw-surfaces 2 and are pivotally joined by the connecting-link 3. As herein shown, the latter consists of a sheet-metal stamping which is folded over the ends of the handles 1 and through the side walls of which and through said ends of the handles the pivot-rivets 4 are passed. The middle portion of the link between the ends of the handles then forms a housing for a spring 5, the extremities of which are seated against the inner sides of the handles to hold the latter normally apart or with their jaws open ready to receive the nut, while to prevent an undue spreading of the handles their pivoted ends are arranged to be stopped against the upper wall of the link or housing, as shown at 6.

It will be observed that an essential feature lies in constructing the connecting-link approximately U-shaped in cross-section, so that it not only embraces the ends of the levers, forming a complete housing for the upper ends thereof, but also forms stops against which the square inclosed ends of the levers normally abut when spread apart by the spring, the top or upper wall of the housing being extended approximately to the outer side walls in order to stop the levers at the proper point and prevent them being spread too far apart to be conveniently grasped. The link also forms a housing for the spring, which is open at its under side, so that the spring may be readily inserted after the parts have been riveted together. This construction renders the device extremely inexpensive to manufacture, as well as very strong and durable.

I claim as my invention—

A nut-cracker comprising a pair of levers having jaws on their inner faces, a link, U-shaped in cross-section, with its top and opposite walls inclosing the two ends of the levers, pivot-pins passing through the side walls and levers, and a spring between said levers, the link forming stops, bearings, and a housing for the upper ends of the levers and the spring.

In testimony that I claim the foregoing as my invention I affix my signature, in presence of two subscribing witnesses, this 2d day of February, A. D. 1900.

GEORGE L. THOMPSON.

Witnesses:
HENRY W. CARTER,
N. R. BAILEY.